Nov. 14, 1944.　　　P. H. STANLEY　　　2,362,731
FLUID CONTROL APPARATUS
Filed May 4, 1943　　　2 Sheets-Sheet 1
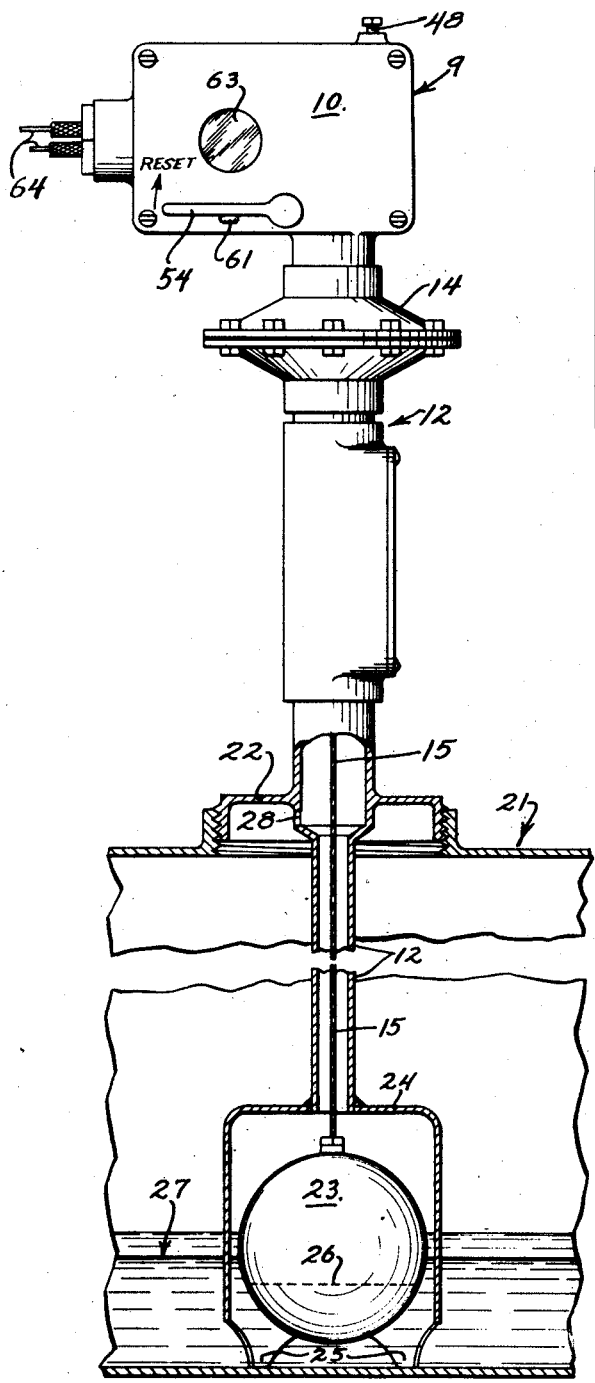
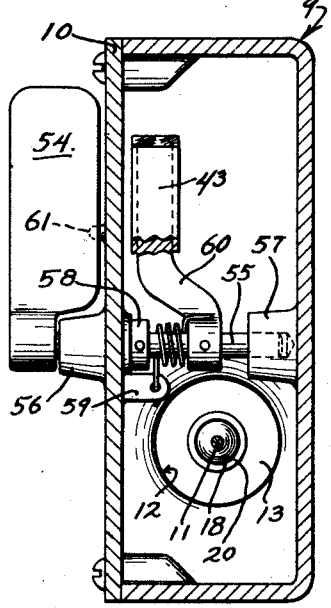
INVENTOR,
PAUL H. STANLEY.
BY
Chas. E. Townsend.
ATTORNEY.

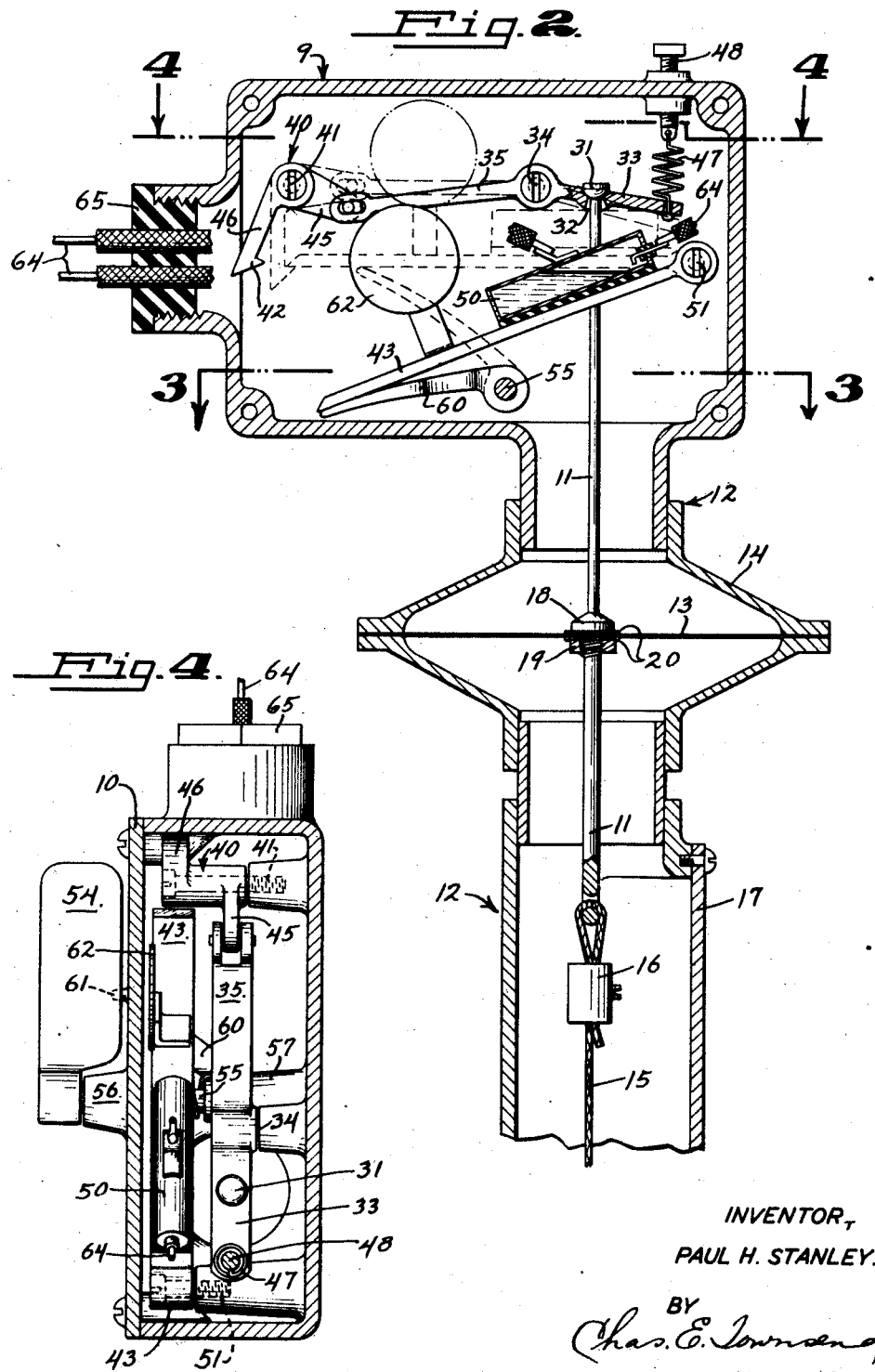

Patented Nov. 14, 1944

2,362,731

UNITED STATES PATENT OFFICE

2,362,731
FLUID CONTROL APPARATUS

Paul H. Stanley, Sacramento, Calif., assignor to Earl H. Markwart, doing business as Yuba Tank & Steel Co., Sacramento, Calif.

Application May 4, 1943, Serial No. 485,600

9 Claims. (Cl. 200—84)

This invention relates to control apparatus, and more particularly to a fluid-control apparatus.

The invention pertains to the solution of the vexatious problem of controlling pumps, shut-off valves, alarm systems, and the like, when a liquid has reached a predetermining level, particularly as in places of storage.

The storage control of gasoline and like products presents several problems which are of particular importance. For one thing, gasoline produces volatile vapors and is highly inflammable and explosive. Any control apparatus must be designed to prevent any possibilities of explosion or ignition originating from said apparatus. Secondly, refined gasoline contains a considerable quantity of water in suspension and when large quantities of the liquid are stored for relatively long periods of time the water gradually settles to the bottom of the storage tank; and, unless the pump is controlled, the accumulated water may be pumped out of the said tank unknowingly and into gasoline engines with obvious bad results. Gasoline control, particularly as to the accumulation of water in gasoline storage tanks, is of vital importance to airplanes as a single gas failure usually causes irreparable harm.

My invention is adapted for the control of all fluids, but will be particularly described herein as applied to the problem of gasoline control and water detection therein. I utilize a duo-gravity float, i. e. a weighted float, which will sink in gasoline but which will float on water. The float is suspended in the storage tank containing the gasoline and "set" at a predetermined position above the floor of the tank. For example, if it is desired to stop the pumps from further taking gasoline from the tank when, say, three inches of water have accumulated on the bottom thereof, the weighted float is positioned adjacent to the floor of the tank so that it will "float" upon the water when three inches thereof have accumulated. Connected to the float by appropriate linkage is a mercury switch which is actuated when the float is lifted or "floated" by the water. The switch is appropriately connected to the pump motor and acts to shut off the said pump immediately the mercury switch is tilted.

As herein illustrated, the mercury switch is positioned in the circuit of the electric pump motor. When the float is lifted by the water the switch is tilted, breaking the circuit and causing the pump to stop action. It is obvious that the mercury switch could be reversed in position and tilting thereof could make the circuit, thereby starting a motor or setting off an alarm; or, of course, the switch need not be positioned in the motor circuit but in an independent switch circuit for any purpose desired.

A feature of my invention is the manual reset mechanism which prevents the circuit from being again made, after it has been broken, until the operator has manually reset the switch. In this manner the cause of switch actuation may be discovered and remedied without the possibility of a too early automatic ungoverned resetting. For example, if water accumulation in a gasoline storage vessel causes the pump circuit to be broken, the operator can manually hold the switch mechanism in "set" position and thereby pump the water out of the vessel, as desired. However, the pump, as illustratively herein controlled, would not be operative in such circumstances unless the said switch was held in position manually.

The duo-gravity float herein described may be modified to be operative with any two fluids, each having a different specific gravity. Of course, an ordinary unweighted float or bob can be utilized for controlling one liquid where a duo-gravity float would be unnecessary.

A general object of my invention is to provide an apparatus for the control of fluids, which is accurate and positive in operation. Other objects of my invention are to provide a control and detection apparatus particularly adapted for use in the control of storage gasoline and other like fluids; to provide an apparatus for the control of fluids which is explosion-proof and vapor-proof; to provide an apparatus for the control of pumps, shut-off valves, alarms, and the like, by utilizing a duo-gravity float; to provide a control apparatus positive in operation and which may be manually reset and adjusted for actuation at any predetermined level of a given liquid; to provide a control apparatus for fluids which is comparatively simple and inexpensive to manufacture and assemble and so sturdy of construction as to resist deterioration; to provide an automatic control apparatus for fluids which must be reset manually and yet which can be held in set operative position by the operator if it is so desired; to provide a control apparatus for fluids which is instantaneous in action at any predetermined point of fluid level, and yet which will not be actuated by shock or impact. Other objects and advantages will become apparent upon reference to the accompanying description and drawings annexed hereto as a part hereof.

Referring now to the drawings in which similar characters of reference represent corresponding parts in the several views:

Fig. 1 is an elevational view of the control apparatus, partly in section and partly broken away, positioned in a conventional liquid storage tank.

Fig. 2 is a sectional view of a portion of my apparatus.

Fig. 3 is a sectional view of the head of the apparatus, taken on line 3—3 of Fig. 2.

Fig. 4 is a sectional view of the head of my apparatus, taken on line 4—4 of Fig. 2.

The apparatus herein described will be illustrated particularly with reference to its adaptation to the problems of gasoline storage. The apparatus comprises preferably a metal rectangular head, generally indicated at 9, having parallel spaced top, bottom and front and rear side walls, the front wall 10 thereof being removable and having, preferably, a metal-to-metal connection to said head. The head houses a reset and switch mechanism which will hereinafter be described. Suspended from the said head and attached to the reset and switch mechanism is a rigid shaft 11, protected by a housing attached to the bottom of the head, generally indicated at 12. The shaft vertically depending from the bottom wall of said head, through an aperture therein, passes through and is rigidly fixed to a diaphragm 13, provided in a diaphragm housing 14, and is formed with a hole at its lower end for the reception of a flexible cable 15. The cable is inserted through the hole and doubled back, forming a loop. A collar 16, equipped with a set-screw, is positioned circumferentially of the cable just below the point of connection with the said shaft, thereby allowing facile adjustment of the cable length.

A removable door 17 is provided in the housing 12 adjacent to the collar connection in order to afford access to the said collar, adjustable cable and rod connection.

As hereinabove stated, the shaft 11 passes through and is rigidly fixed to a diaphragm 13 of either metal, rubber, or any other suitable material. The shaft is in sealed relation with the diaphragm in order to prevent the passage of vapors upwardly through the housing and adjacent to the rod to the head which houses the switch and reset mechanism. If volatile gases were allowed to reach the head and electrical switch housed therein disastrous results might follow if an electrical arc was struck. The shaft is provided with a shoulder 18 on one side of the diaphragm which abuts thereagainst and it is formed with an enlarged threaded portion for the reception of a correspondingly threaded nut 19 which is screwed on to the said shaft on the side of the diaphragm opposite to that of the shoulder. Washers 20 can be positioned between the shoulder and diaphragm and between the nut and the diaphragm in order to make a secure sealing fit of the shaft and diaphragm when the shoulder and nut are drawn tight thereagainst. It is contemplated that the diaphragm will have a vertical play of approximately $\frac{1}{16}$ inch at its center point, depending on the circumstances of installation.

Fig. 1 shows the control apparatus positioned in a gasoline storage tank, indicated generally at 21, through a screw cap 22. A duo-gravity float 23, suspended from cable 15, is positioned in a float housing 24. The float housing, attached to the cable housing 12, is formed with a plurality of spaced legs 25, adapted to rest on the floor of the tank, in order that the liquid will have easy access thereinto and so completely surround and encompass the said float. The duo-gravity float herein illustrated is globular in shape. However, it is contemplated that cylindrical or even rectangular floats may be used.

The weighted part of the float is indicated by broken lines at 26 and the water line is indicated generally at 27. It is obvious that the water line must rise above the weighted portion of the float in order to cause it to "float." Consequently, modification of the float and proper positioning thereof in a storage tank must depend upon the circumstances and particular problems of a given installation.

A vent hole 28 is provided in the cable housing 12 just below the top of the storage tank and above the liquid high level in order to insure against pressure built up within the tank by the weight of liquid, creating a pressure within the said housing which might force the diaphragm upwardly.

The upper end of the shaft 11 is supported from the reset latch mechanism. Specifically, the shaft is provided with a ball head 31, supported in a bore 32, provided in a lever 33. The bottom of the bore is flared outwardly to allow limited angular movement between the shaft and lever and obviates any binding thereof. Lever 33 is pivotally connected to the back of the head at 34 and extends therefrom to form a clevis arm 35. The clevis arm 35 in turn is slidably connected to a bell-crank 40 which is pivotally attached to the back wall of the head at 41. The bell-crank 40 is formed with a detent 42 for engagement with the end of the switch support 43. The bottom portion of the bell-crank is tapered in order to provide a sliding contact for the switch support when it is lifted for engagement with the detent.

It is here noted that the bell-crank 40 is formed of two integral parts, each in a different vertical plane; the arm 45 which connects with the clevis arm being in one plane while the latching arm 46 of the bell-crank is spaced from said arm 45 in the vertical plane of the switch support. It should be here noted that lever 33 is connected to a counterbalance coil spring 47 which is, in turn, connected to an adjustable screw 48. This spring and screw arrangement allows for adjustable counterbalancing of the downward pull on lever 33 and trips the latch mechanism when the downward pull is released from said lever as will hereinafter appear.

The aggregate weight of the shaft 12, cable 15 and float 23, immersed in gasoline, is greater than the upward urge of the spring 47 exerted on pivotally mounted lever 33. The shaft 12, being rigidly connected to the diaphragm 13, consequently maintains the said diaphragm in a depressed position. However, when the float is lifted, downward pull on the diaphragm is alleviated, causing it to move upwardly from its depressed position and thereby causing the shaft 12 to move upwardly through bore 32, releasing the downward pull on lever 33. When the downward pull is released from lever 33, spring 47 urges lever 33 upwardly, clevis arm 35 downwardly, and bell-crank latching arm 46 outwardly, thereby allowing the switch support 43 to fall.

The switch mechanism comprises a conventional mercury switch 50, mounted on the switch support 43, which is pivotally attached to the head at 51. A manual reset handle 54, positioned on the outside of the front wall of the head, is rigidly connected to a shaft 55 which is inserted through the head through a bored boss 56, and journaled within the head in a bored boss 57 rigidly affixed to the back wall of the head and in horizontal alignment with boss 56. A collar 58, equipped with a set-screw, retains the shaft 55 in position in said head. A coil spring is fixed at one end to a stud 59 which is connected to the front wall of the head. The other end of the spring is fixed to a cam 60. The cam 60 is removably keyed to the shaft 55 to lie in the same horizontal plane as the reset handle. A projecting pin 61 is provided on the outer part of the front wall of the head to keep the reset handle 54 from twisting downwardly below the bottom of the head by action of the spring biased cam 60.

A portion of the cam 60 is formed to lie below the switch support in the vertical plane thereof, and when the said support is down or in "off" position it is carried on said cam. A signal image 62 is mounted on said support so that when the switch is "off" or in down position the signal image is in register with a window 63 provided in the front face of the head.

Lead wires 64 are led into the head through a fiber seal 65, provided in the said head, and are connected to the mercury switch. As indicated in Fig. 1 in full lines, the circuit is broken as the mercury level does not afford electrical contact between the said leads. However, upon "setting" the switching mechanism the mercury will make contact with lead 64 and thereby complete the circuit. In order to reset the mechanism, handle 54 is tilted upwardly which, in turn, carries the switch support upwardly until it is latched in engagement with bell-crank latching arm 46.

In operation, assuming the circuit is made (i. e. the switch support is latched to the bell-crank as indicated in broken lines) if the float is raised the weight will be released from the diaphragm and it will move upwardly, releasing the downward pull on the lever 33 and causing lever 33 to move upwardly from its full line position because of the tension of counterbalance coil spring 47 and thereby force the bell-crank detent to move outwardly from engagement with the switch support. The switch support will then fall to its full line position, thereby breaking the circuit and stopping the pump motor.

While I have illustrated and described my invention in more or less detail, it is understood that various applications of use, changes in detail of structure and other modifications are contemplated. The invention is not intended to be limited to the illustrative description and drawings contained herein, but only by the scope of the appended claims and spirit of the invention.

I claim:

1. Control means responsive to the height of the surface of a liquid, comprising a member adapted to float on the liquid, a mercury switch, a pivotally mounted support for the mercury switch to tilt it, latch means to hold the support and thereby the switch in raised position, and means tending to unlatch the latch means, the member in lower position opposing and making the unlatching means inoperative and in raised position permitting the unlatching means to operate, said switch being unresponsive to movement of said float and unlatching means when said switch is in unlatched position.

2. Control means responsive to the surface of a liquid, comprising, in combination, a duo-gravity float, a mercury switch, means to latch said switch in one position, means tending to unlatch said switch, and means linking said float and latching mechanism whereby said unlatching means is directly responsive to the elevation of said float when said switch is in latched positions, said linking means including a diaphragm.

3. Control means for liquids comprising a float member, a diaphragm linked to said float and responsive to movement thereof, latching mechanism linked to said diaphragm, a switch adapted to be operative in one position thereof and inoperative in another, manual means to latch said switch in operative position, means including said diaphragm and latching mechanism to link said switch to said float when in operative position, and means to unlatch said switch and break the linkage from float to switch.

4. Control means for liquids comprising a head, a switch in said head, means to latch said switch in one position, a float, and means to unlatch said switch and thereby change the position thereof, said switch being linked to said float and directly responsive to movement of said float when said switch is in latched position and not linked to said float and unresponsive to movement of said float when in unlatched position.

5. Control means for liquids comprising a head, a duo-gravity float, a switch having latched and unlatched positions, means to link said switch to said float in latched position, and means to unlatch said switch and thereby break the linkage between said switch and float.

6. Control means for liquids comprising a head, a duo-gravity float, a switch having latched and unlatched positions, means to link said switch to said float in latched position, said means including a diaphragm, and means to unlatch said switch and thereby break the linkage between said switch and float.

7. Control means for liquids comprising a head, a duo-gravity float, a switch having latched and unlatched positions, means to link said switch to said float in latched position, means to unlatch said switch and thereby break the linkage between said switch and float, and manual means to latch said switch in latched position.

8. Control means for liquids comprising a head having a window, a float, a switch having latched and unlatched positions, means to link said switch to said float when in latched position whereby said switch is directly responsive to movement of said float, means to unlatch said switch and break the linkage between said switch and float and thereby render said switch unresponsive to movement of said float, and indicating means in said head responsive to change of position of said switch whereby said change of position is visually accessible to an observer through said window.

9. Control means for liquids comprising a head having a window, a float, a switch having latched and unlatched positions, means to link said switch to said float when in latched position whereby said switch is directly responsive to movement of said float, means to unlatch said switch and break the linkage between said switch and float and thereby render said switch unresponsive to movement of said float, indicating means in said head responsive to change of position of said switch whereby said change of position is visually accessible to an observer through said window, and manual means to move said switch from unlatched to latched position.

PAUL H. STANLEY.